US006478624B2

(12) United States Patent
Ramey et al.

(10) Patent No.: US 6,478,624 B2
(45) Date of Patent: Nov. 12, 2002

(54) HIGH SPEED CONNECTOR

(75) Inventors: Samuel C. Ramey, Naperville, IL (US); Johannes Petrus Maria Kusters, Sellersburg, IN (US)

(73) Assignee: Robinson Nugent, Inc., New Albany, IN (US)

( * ) Notice: Subject to any disclaimer, the term of this patent is extended or adjusted under 35 U.S.C. 154(b) by 0 days.

(21) Appl. No.: 09/887,890

(22) Filed: Jun. 22, 2001

(65) Prior Publication Data

US 2002/0022401 A1 Feb. 21, 2002

Related U.S. Application Data

(60) Provisional application No. 60/214,917, filed on Jun. 29, 2000.

(51) Int. Cl.[7] .......................................... H01M 13/648

(52) U.S. Cl. ................................... 439/608; 439/733.1

(58) Field of Search ............................... 439/701, 608, 439/626, 656, 658, 733.1, 660

(56) References Cited

U.S. PATENT DOCUMENTS

| | | |
|---|---|---|
| 4,538,866 A | 9/1985 | Johnson |
| 4,571,014 A | 2/1986 | Robin et al. |
| 4,655,518 A | 4/1987 | Johnson et al. |
| 4,659,155 A | 4/1987 | Walkup et al. |
| 4,724,180 A | 2/1988 | Kern |
| 4,836,791 A | 6/1989 | Grabbe et al. |
| 4,846,727 A | 7/1989 | Glover et al. |
| 4,854,899 A | 8/1989 | Matthews |
| 4,867,690 A | 9/1989 | Thumma |

(List continued on next page.)

FOREIGN PATENT DOCUMENTS

| | | |
|---|---|---|
| DE | 3605316 A1 | 8/1987 |
| DE | 3904461 C1 | 9/1990 |
| EP | 0746060 A2 | 12/1996 |
| EP | 0769828 A2 | 4/1997 |
| EP | 0854549 A2 | 7/1998 |
| EP | 0865113 A2 | 9/1998 |
| EP | 0907225 A2 | 4/1999 |
| GB | 2315614 A | 2/1998 |
| WO | WO 94/16477 | 7/1994 |
| WO | WO 98/00889 | 1/1998 |
| WO | WO 98/10492 | 3/1998 |
| WO | WO 98/48485 | 5/1998 |
| WO | WO 98/24154 | 6/1998 |
| WO | WO 98/19370 | 7/1998 |
| WO | WO 98/35408 | 8/1998 |
| WO | WO 98/35409 | 8/1998 |
| WO | WO 99/26321 | 5/1999 |

OTHER PUBLICATIONS

European Patent Office PCT International Search Report dated Mar. 4, 2002.

*Primary Examiner*—Tho D. Ta
*Assistant Examiner*—Edwin A. León
(74) *Attorney, Agent, or Firm*—Barnes & Thornburg

(57) ABSTRACT

A connector includes a plurality of horizontally-spaced contacts arranged in a row with each contact having a forwardly-extending contact portion configured to engage a corresponding contact in a mating connector, an intermediate portion and a rearwardly-extending tail portion. An insulative housing encases the intermediate portions of the contacts. The housing has horizontally-spaced, vertical slots between the contact intermediate portions. A shield is provided for each contact. Each shield has a vertical flange portion for insertion into a vertical slot and an upper horizontal portion extending along and above the intermediate portion of the adjacent contact. The insulative housings with contacts and shields assembled therein are configured to be inserted into horizontally-extending slots in a connector housing.

11 Claims, 9 Drawing Sheets

U.S. PATENT DOCUMENTS 4,869,677 A 9/1989 Johnson et al.
4,871,321 A 10/1989 Johnson
4,909,743 A 3/1990 Johnson et al.
4,914,062 A 4/1990 Voltz
4,932,888 A 6/1990 Senor
4,975,084 A 12/1990 Fedder et al.
5,046,960 A 9/1991 Fedder
5,066,236 A 11/1991 Broeksteeg
5,104,341 A 4/1992 Gilissen et al.
5,133,679 A 7/1992 Fusselman et al.
5,135,405 A 8/1992 Fusselman et al.
5,137,475 A 8/1992 Hillbish et al.
5,141,445 A 8/1992 Little
5,175,928 A 1/1993 Grabbe
5,228,871 A 7/1993 Goodman
5,281,161 A 1/1994 Kanai
5,282,752 A 2/1994 Doutrich et al.
5,286,212 A 2/1994 Broeksteeg
5,342,211 A 8/1994 Broeksteeg
5,360,349 A 11/1994 Provencher et al.
5,403,206 A 4/1995 McNamara et al.
5,484,310 A 1/1996 McNamara et al.
5,500,788 A 3/1996 Longueville et al.
5,509,824 A * 4/1996 Rodrigues et al. .......... 439/608
5,518,422 A 5/1996 Zell et al.
5,586,911 A * 12/1996 Miller et al. ................ 439/607
5,596,490 A 1/1997 Cohen et al.
5,605,476 A 2/1997 McNamara et al.
5,607,326 A 3/1997 McNamara et al.
5,620,340 A 4/1997 Andrews
5,632,635 A 5/1997 Vanbesien et al.
5,660,551 A 8/1997 Sakurai
5,664,968 A 9/1997 Mickievicz
5,672,064 A 9/1997 Provencher et al.
5,700,164 A 12/1997 Weidler et al.
5,702,258 A * 12/1997 Provencher et al. .......... 439/79
5,704,793 A 1/1998 Stokoe et al.
5,738,544 A 4/1998 Davis
5,755,595 A 5/1998 Davis et al.
5,788,537 A 8/1998 Davis et al.
5,788,538 A 8/1998 Belopolsky et al.
5,795,191 A 8/1998 Preputnick et al.
5,797,770 A 8/1998 Davis et al.
5,820,397 A 10/1998 Stokoe
5,820,412 A 10/1998 Koegel et al.
5,851,121 A 12/1998 Thenaisie et al.
5,860,816 A * 1/1999 Provencher et al. ........ 439/701
5,863,222 A 1/1999 Kinsey, Jr. et al.
5,876,247 A 3/1999 Hashimoto
5,904,594 A 5/1999 Longueville et al.
5,980,321 A 11/1999 Cohen et al.
6,290,515 B1 * 9/2001 Lee ............................ 439/108
6,293,827 B1 * 9/2001 Stokoe ........................ 439/108
6,354,877 B1 * 3/2002 Shuey et al. ................ 439/608

* cited by examiner

HIGH SPEED CONNECTOR

CROSS-REFERENCE TO RELATED APPLICATION

This application claims the benefit of U.S. Provisional Patent Application, Ser. No. 60/214,917, filed on Jun. 29, 2000.

BACKGROUND AND SUMMARY OF THE INVENTION

This invention relates to two-part electrical connectors, and particularly to improvements in shielded two-part high-speed electrical connectors.

Conductors carrying high frequency signals and currents are subject to interference and cross talk when placed in close proximity to other conductors carrying high frequency signals and currents. This interference and cross talk can result in signal degradation and errors in signal reception. Coaxial and shielded cables are available to carry signals from a transmission point to a reception point, and reduce the likelihood that the signal carried in one shielded or coaxial cable will interfere with the signal carried by another shielded or coaxial cable in close proximity. However, at points of connection, the shielding is often lost allowing interference and crosstalk between signals. The use of individual shielded wires and cables is not desirable at points of connections due to the need for making a large number of connections in a very small space. In these circumstances, two-part high-speed connectors containing multiple shielded conductive paths are used.

U.S. patent application, Ser. No. 09/373,147, entitled "High Speed Connector Apparatus", and now U.S. Pat. No. 6,146,202, discloses an illustrative shielded two-part high-speed connector comprising a socket connector and a header connector. The illustrative socket connector includes a plurality of connector modules. Each connector module includes an insulative housing encasing a plurality of longitudinally-extending vertically-spaced signal contacts arranged in a column. Each insulative housing is formed to include a plurality of laterally-extending vertically-spaced openings which are interleaved with the plurality of longitudinally-extending vertically-spaced signal contacts. The socket connector further includes a plurality of vertical shields extending along the first sides of the plurality of connector modules, and a plurality of horizontal shields extending through the laterally-extending vertically-spaced openings in the plurality of connector modules to form a coaxial shield around each signal contact.

According to the present invention, an illustrative connector includes a plurality of connector modules. Each connector module includes an insulative housing encasing a plurality of longitudinally-extending laterally-spaced signal contacts arranged in a row. Each insulative housing is formed to include a plurality of vertically-extending laterally-spaced openings which are interleaved with the plurality of longitudinally-extending laterally-spaced signal contacts. The connector further includes a plurality of shields. Each shield has a vertically-extending flange portion for insertion into a vertically-extending opening in the insulative housing and a laterally-extending flange portion extending along and adjacent to a signal contact in the insulative housing. The vertically and laterally-extending flange portions are configured to form a coaxial shield around each signal contact. According to one illustrative embodiment, the laterally-extending flange portion extends along and above an adjacent signal contact in the insulative housing. According to still another illustrative embodiment, the insulative housings with contacts and shields assembled therein are configured for insertion into laterally-extending vertically-spaced slots in a connector housing.

According to a further illustrative embodiment, an illustrative connector includes a plurality of longitudinally-extending laterally-spaced signal contacts arranged in a row. Each signal contact includes a forwardly-extending contact portion configured to engage a corresponding contact in a mating connector, an intermediate portion and a rearwardly-extending tail portion. An insulative housing encases the intermediate portions of the signal contacts. The insulative housing includes laterally-spaced, vertically-extending slots between the contact intermediate portions. A shield is provided for each signal contact. Each shield has a vertically-extending flange portion for insertion into a slot in the insulative housing and an upper laterally-extending flange portion extending along and above the intermediate portion of an adjacent signal contact. The vertically and laterally-extending flange portions form a coaxial shield around each signal contact. The insulative housings with contacts and shields assembled therein form connector modules which are configured for insertion into a connector housing.

According to a further illustrative embodiment, an illustrative connector includes a plurality of horizontally-spaced signal contacts arranged in a row. Each signal contact includes a forwardly-extending contact portion configured to engage a corresponding contact in a mating connector, an intermediate portion and a rearwardly-extending tail portion. An insulative housing encases the intermediate portions of the signal contacts. The insulative housing includes horizontally-spaced, vertically-extending slots between the contact intermediate portions. A shield is provided for each signal contact. Each shield has a vertical flange portion for insertion into a slot in the insulative housing and an upper horizontal flange portion extending along and above the intermediate portion of an adjacent signal contact. The vertical and horizontal flange portions form a coaxial shield around each signal contact. The insulative housings with contacts and shields assembled therein form connector modules which are configured for insertion into a connector housing.

Alternatively, the connector modules may be pressed into single row insulators with a press-fit connection, with one single row insulator for each connector module. The assembled connector modules may then be stacked to a desired height, and inserted into a housing. The housing captures the assembled connector modules, and provides insulation and shielding around the stacked assembly.

Additional features of the present invention will become apparent to those skilled in the art upon a consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
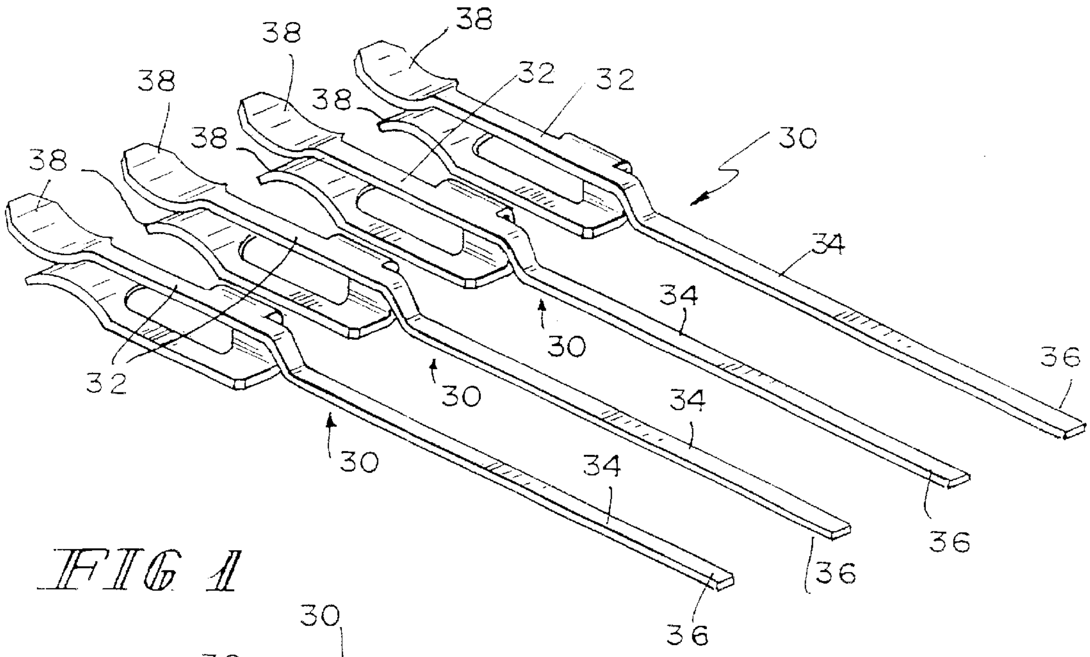
FIG. 1 is a perspective view showing a plurality of signal contacts arranged in a horizontal row, each contact having a forwardly-extending contact portion configured to engage a corresponding contact in a mating connector, an intermediate portion and a rearwardly-extending tail portion.

FIG. 1 shows four horizontally-spaced, signal contacts 30 arranged in a row. The contacts 30 are arranged in rows instead of columns. The horizontal spacing between the adjacent contacts 30 is 2 millimeters. Each contact 30 includes a forwardly-extending contact portion 32 configured to engage a corresponding signal pin of a mating header connector (not shown), an intermediate portion 34 and a rearwardly-extending tail portion 36. Each contact portion 32 includes a pair of opposed cantilevered spring arms 38 into which a signal pin of a mating header connector is inserted when a socket connector 20 and a header connector are mated. The tail portions 36 are soldered to cable wires. Preferably, the contacts 30 are stamped out of a strip of suitable conductive material, and are manufactured reel to reel. The strip can be cut to any length to create variable connector lengths (e.g., eight signal contacts to a row instead of four to a row).

Figure 2:
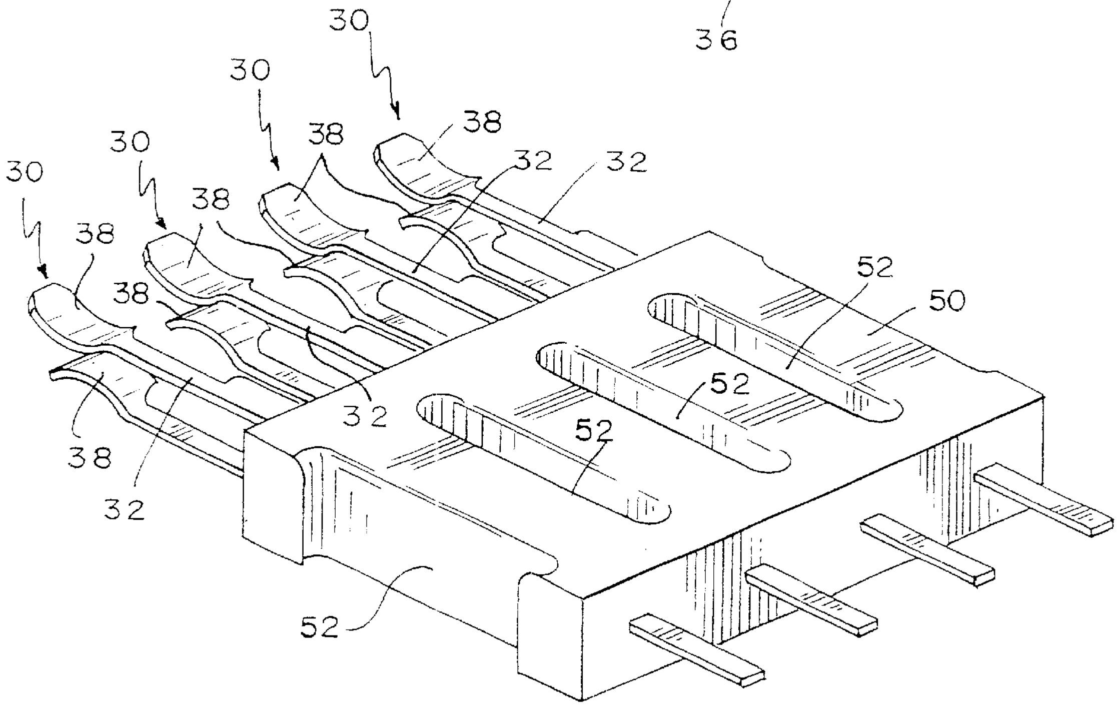
FIG. 2 is a perspective view showing the contact intermediate portions encased in an insulative housing, the insulative housing having horizontally-spaced, vertical slots between the contact intermediate portions.

As best shown in FIG. 2, an insulative housing 50 encases the contact intermediate portions 34. The insulative housing 50 includes four horizontally-spaced, vertically-extending slots 52 arranged between the contact intermediate portions 34 for receiving four shields 60—one shield 60 for each contact 30. The housing 50 (sometimes referred to herein as the "contact overmold") is formed by overmolding a plastic insulator over the contact intermediate portions 34. The overmolding process can be also performed reel to reel as the contacts 30 are fed on a strip. The vertical slots 52 are formed simultaneously between adjacent contacts 20 as the insulative housing 50 is overmolded over the contacts 30. A jog is provided in the tail portion 36 to center the tail portion 26 in the plastic overmold 50 during the overmolding operation.

Figure 3:
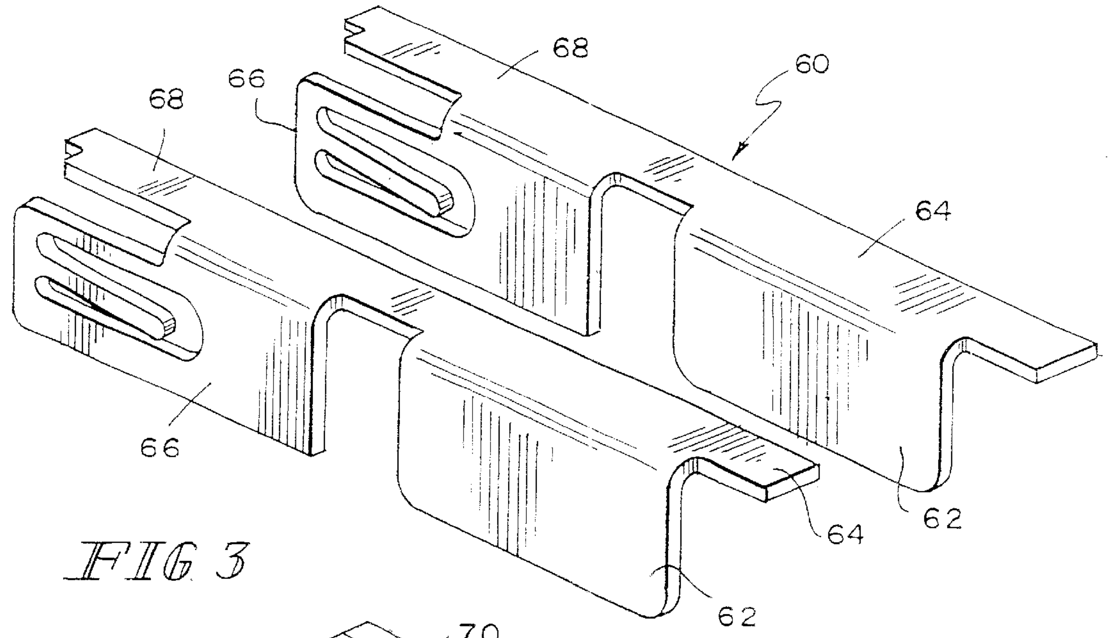
FIG. 3 is a perspective view showing two shields-one shield per contact, each shield having a vertical flange portion for insertion into a vertically-extending slot in the insulative housing and an upper horizontal portion extending along and above the intermediate portion of the adjacent contact.
Figure 12:
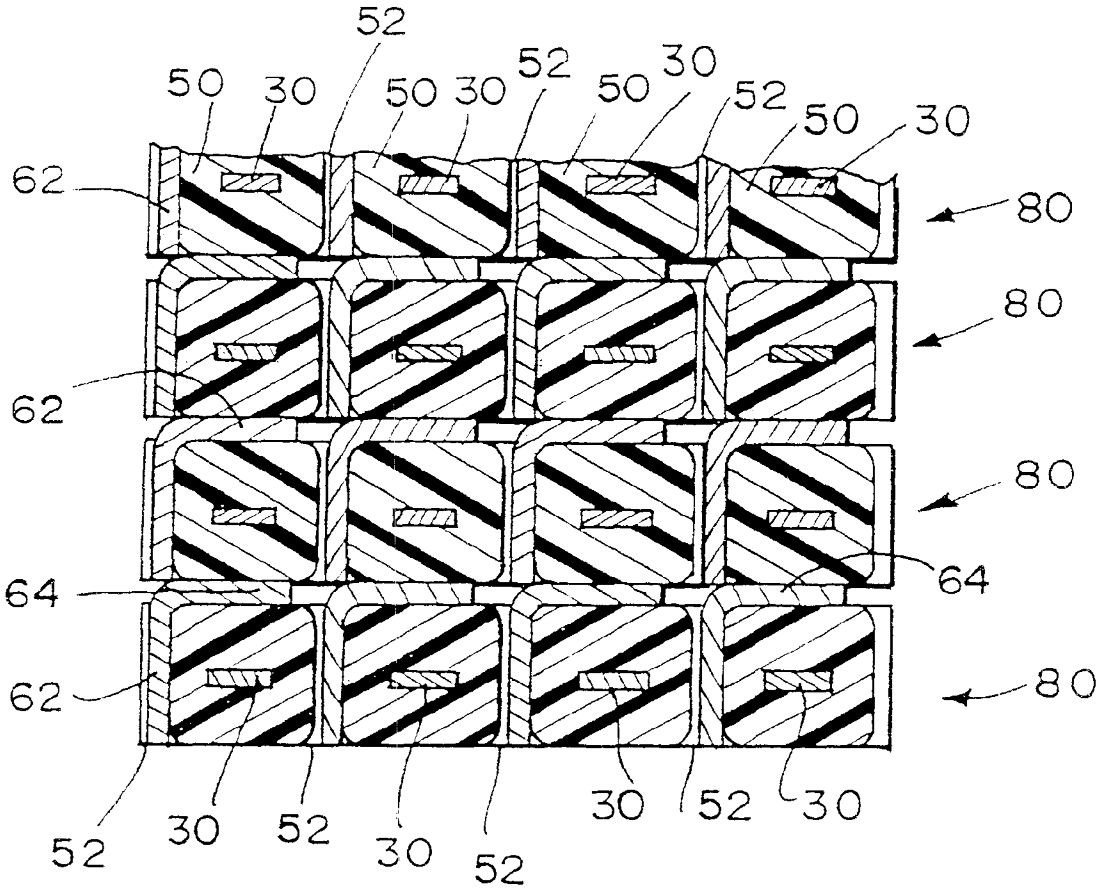
FIG. 12 is a partial sectional view of the FIG. 11 connector showing vertical and horizontal shielding portions of shields forming a virtual coaxial box around each signal contact.

FIG. 3 shows two horizontally-spaced apart shields 60. The horizontal spacing between the adjacent shields 60 is 4 millimeters. Preferably, the shields 60 are stamped out of a strip of suitable conductive material, and are manufactured reel to reel. The 4 millimeter spacing between the shields 60 makes it possible to manufacture the shields 60 reel to reel. Each shield 60 includes a vertical flange portion 62 for insertion into a slot 52 in the insulative housing 50, and an upper horizontal portion 64 extending along and above the intermediate portion 34 of the adjacent contact 30. The vertical flange portion 62 of each shield 60 includes a forwardly-extending vertical shield portion 66 configured to be located next to a forwardly-extending contact portion 32 of an adjacent contact 30. The forwardly-extending vertical shield portion 66 is configured to engage a ground pin of a mating header connector (not shown) to couple the shield 60 to ground. The upper horizontal portion 64 of each shield 60 includes a forwardly-extending horizontal shield portion 68 configured to be located above a forwardly-extending contact portion 32 of an adjacent contact 30. As shown in FIG. 12, the vertical flange portion 62 provides shielding between adjacent columns of contacts 30. The upper horizontal portion 64 provides shielding between adjacent rows of contacts 30.

Figure 4:
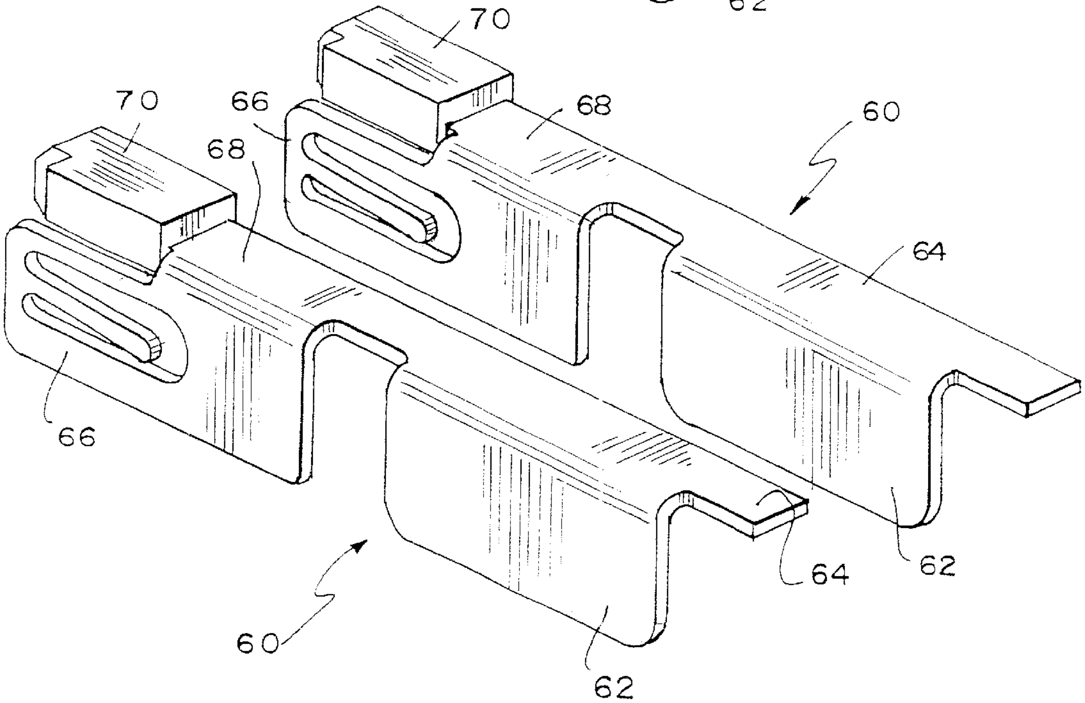
FIG. 4 is a perspective view showing plastic overmolds formed on the upper horizontal portions of the shields adjacent to the front end.

As shown in FIG. 4, the forwardly-extending horizontal shield portion 68 of each shield 60 includes an insulative housing 70 surrounding the forwardly-extending horizontal shield portion 68. The insulative housing 70 (sometimes referred to herein as the "shield overmold") may be formed by overmolding a plastic insulator over the forwardly-extending horizontal shield portion 68 of the upper horizontal portion 64. The overmolding process can also be performed reel to reel as the shields 60 are fed on a strip. The plastic overmold 70 prevents the vertically-compliant spring arms 38 from accidently contacting the forwardly-extending horizontal shield portion 68 when a signal pin of the header connector (not shown) is inserted between the vertically compliant spring arms 38 as the socket connector 20 is mated with a header connector (not shown).

Figure 5:
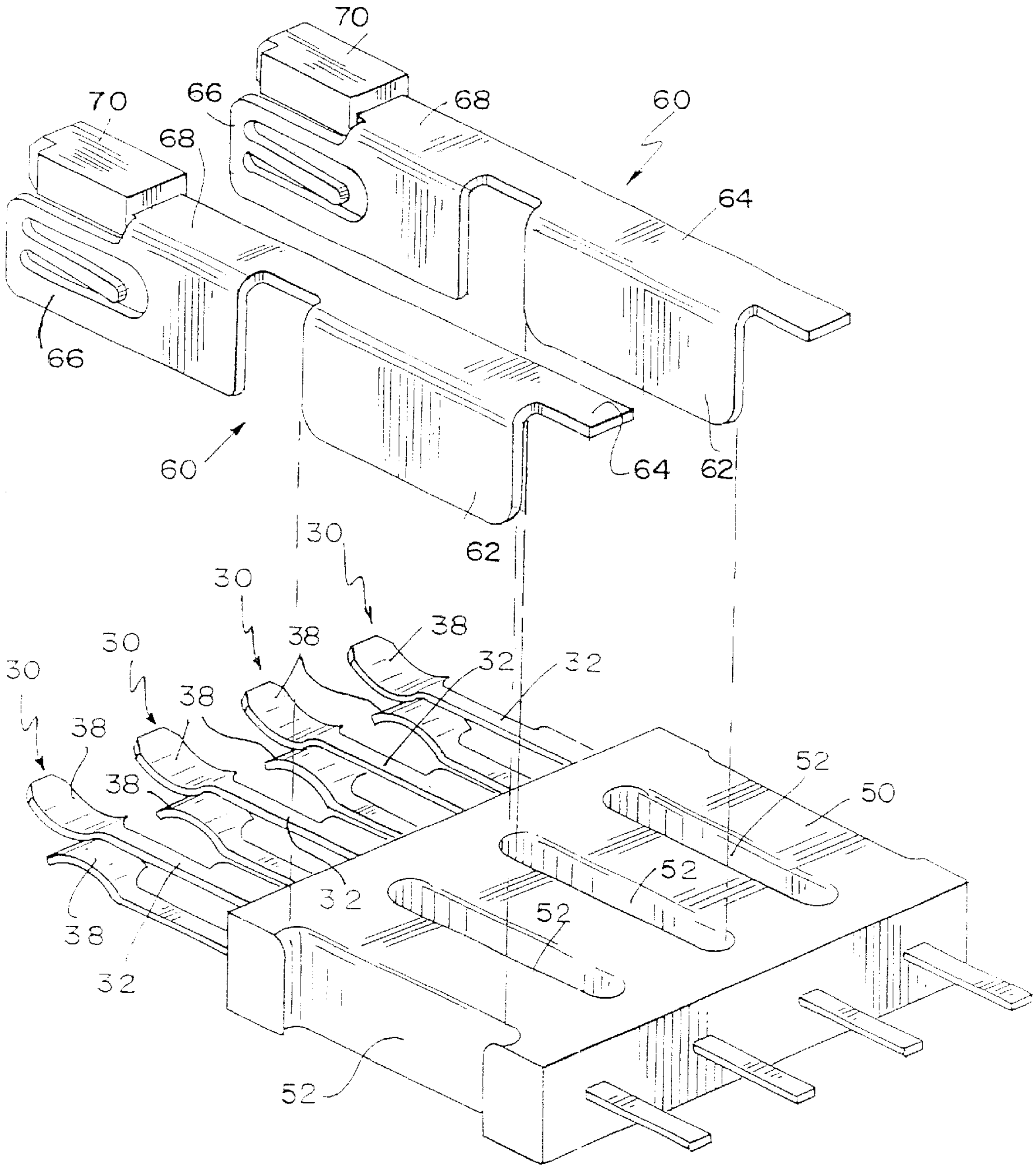
FIG. 5 is a perspective view showing a first set of shields vertically aligned with first and third slots in the insulative housing.
Figure 6:
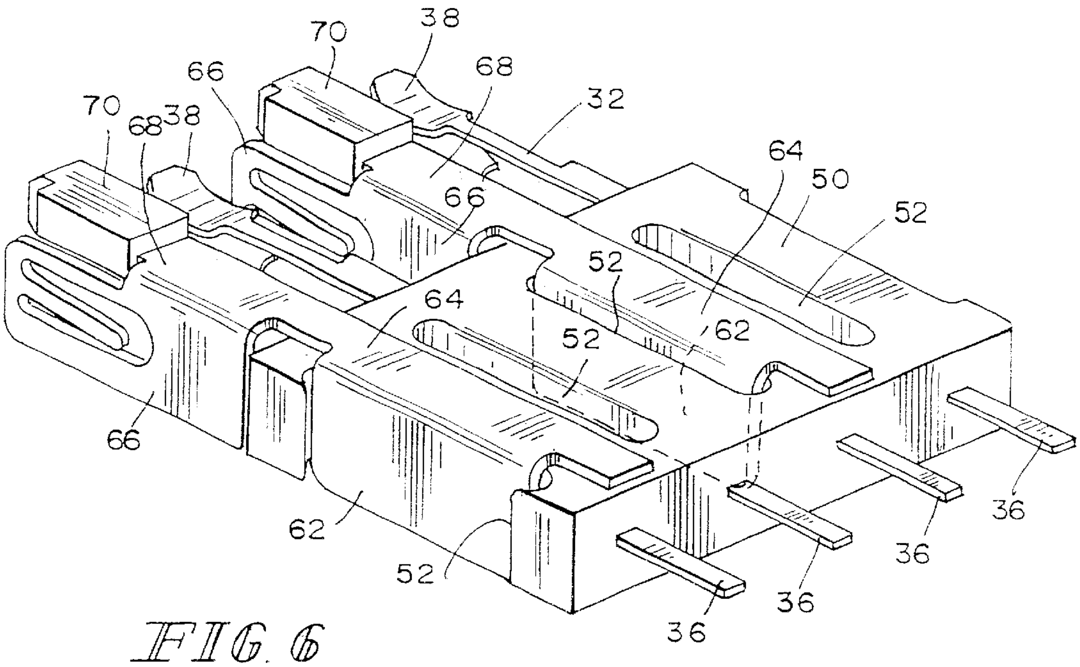
FIG. 6 is a perspective view showing the first set of shields pressed into the first and third slots in the insulative housing with a press-fit connection.
Figure 7:
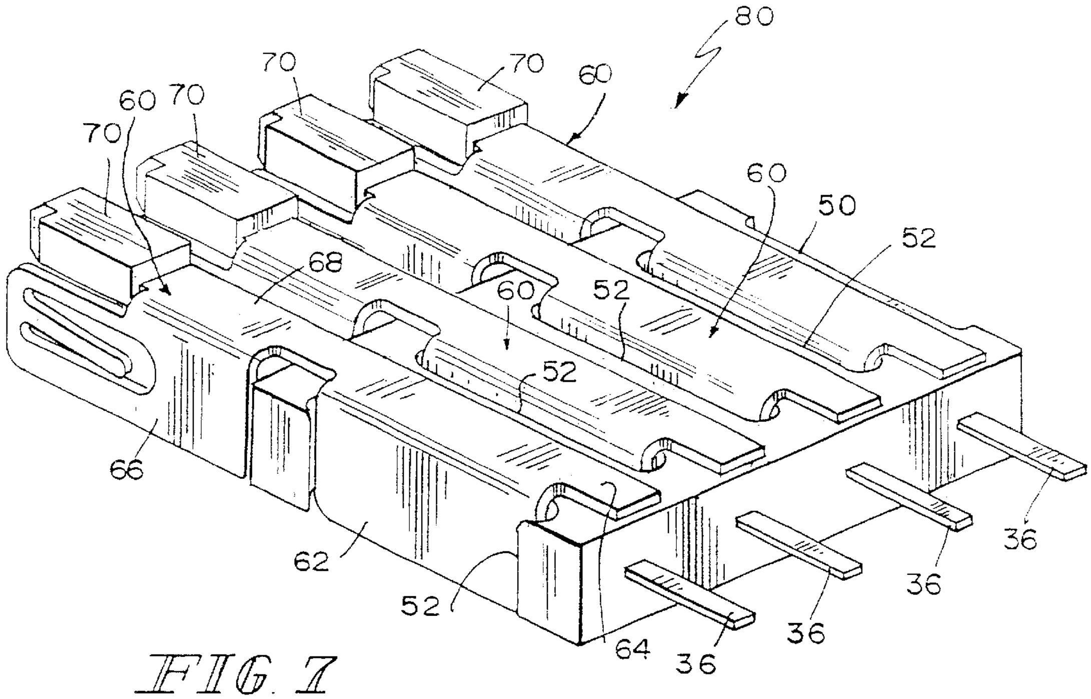
FIG. 7 is a perspective view showing a second set of shields pressed into second and fourth slots in the insulative housing with a press-fit connection to form a connector module or wafer.

FIG. 5 shows a first set of shields 60 vertically aligned with first and third slots 52 in the contact overmold 50 having contacts 30 embedded therein. FIG. 6 shows the first set of shields 60 pressed into the first and third slots 52 in the plastic overmold 50 with a press-fit connection. FIG. 7 shows a second set of shields 60 pressed into second and fourth slots 52 in the plastic overmold 50 with a press-fit connection to form a connector module 80 (also referred to as a wafer). Thus, the contacts 30 are formed on strips with the horizontal spacing between the successive contacts 30 a first distance (2 millimeters). The shields 60, on the other hand, are formed on strips with the horizontal spacing between the successive shields 60 a second distance (4 millimeters) equal to twice the first distance (2 millimeters) such that a first set of shields 60 may be inserted into every other slot 52 while disposed on a first strip and then a second set of shields 60 may be inserted into the empty slots 52 between the first set of shields 60 while disposed on a second strip.

Figure 8:
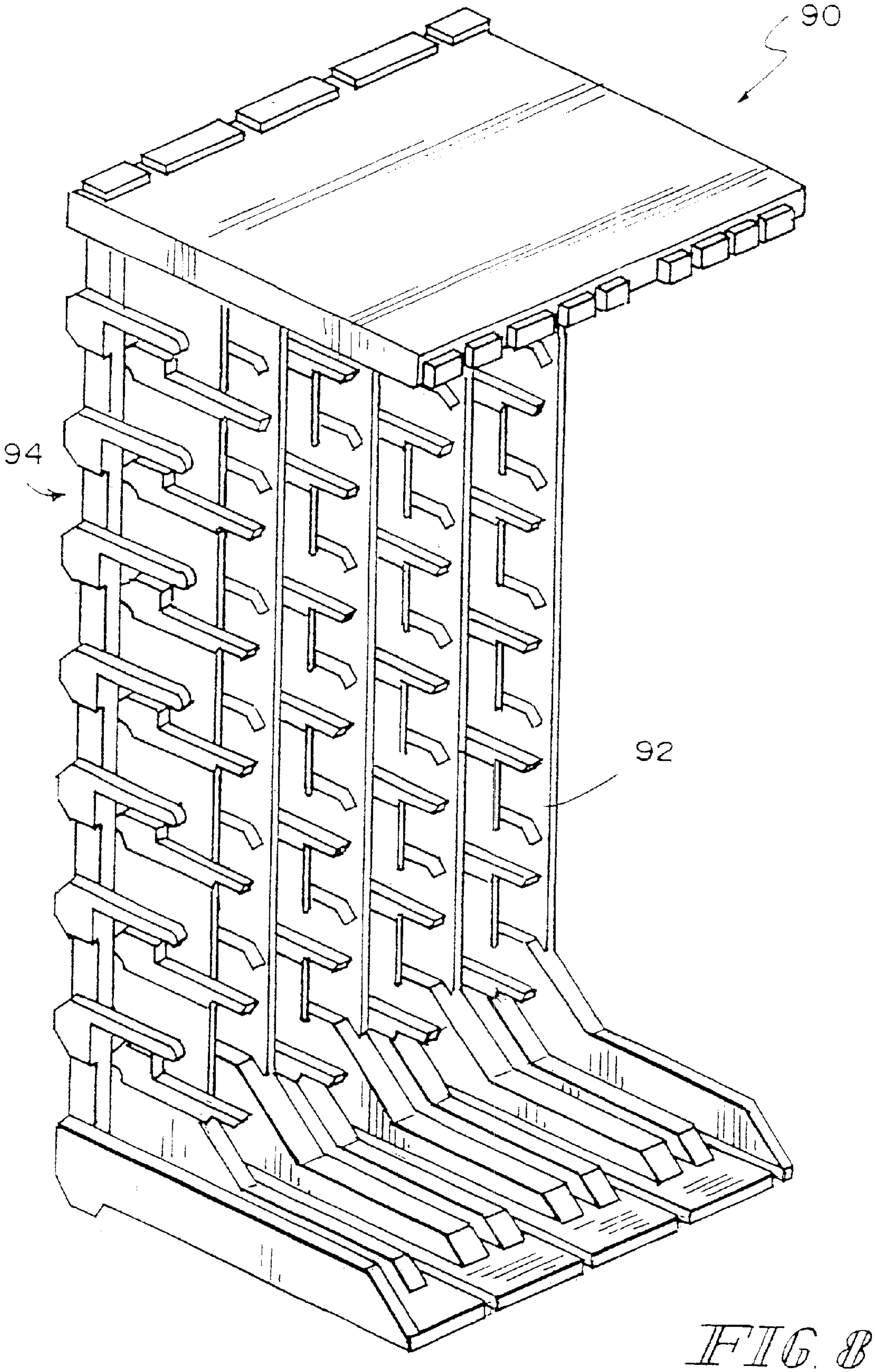
FIG. 8 is a perspective view showing a front cap having horizontally-extending slots for receiving the connector modules.
Figure 9:
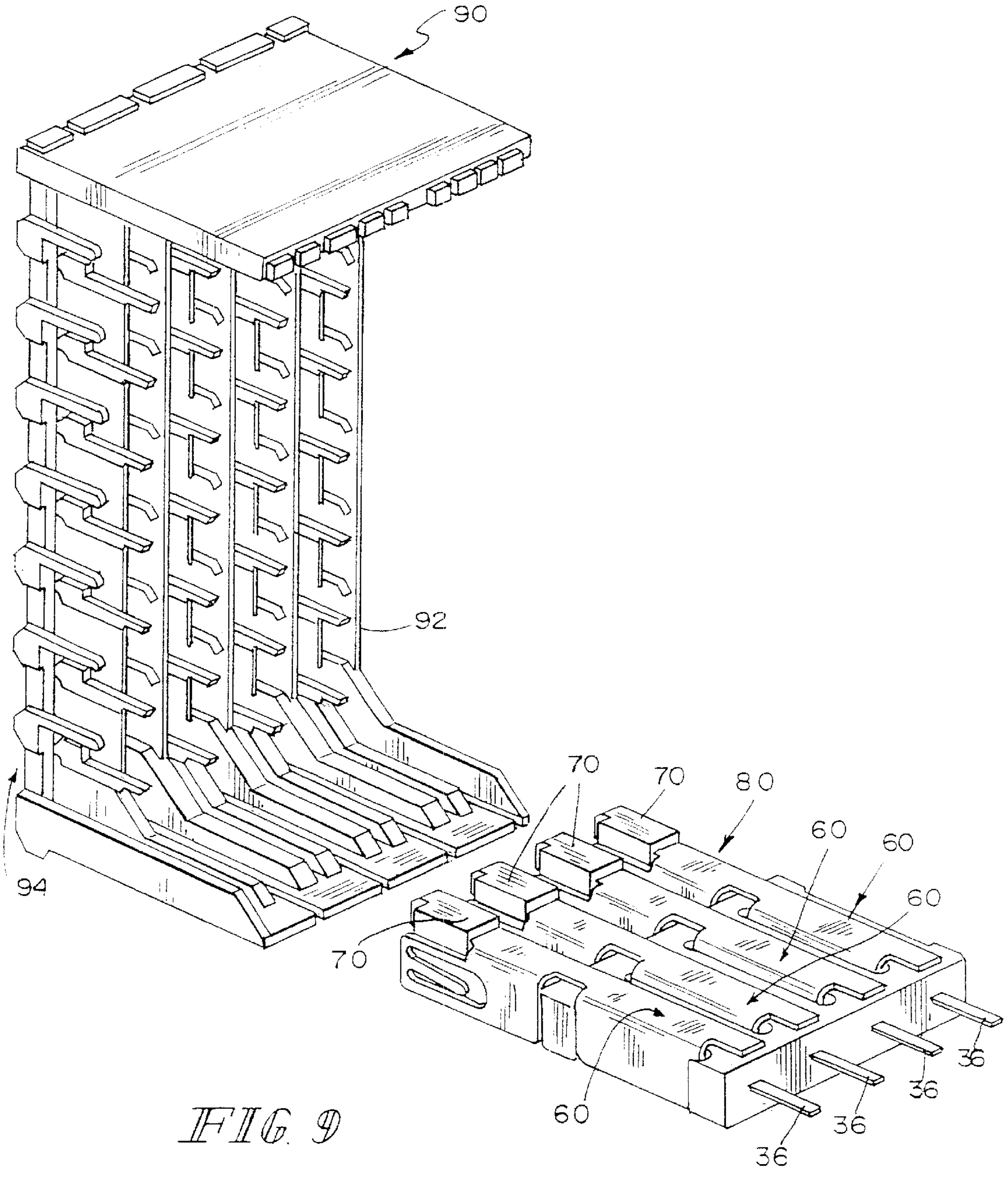
FIG. 9 is a perspective view showing a connector module aligned with a horizontally-extending slot in a front cap.
Figure 10:
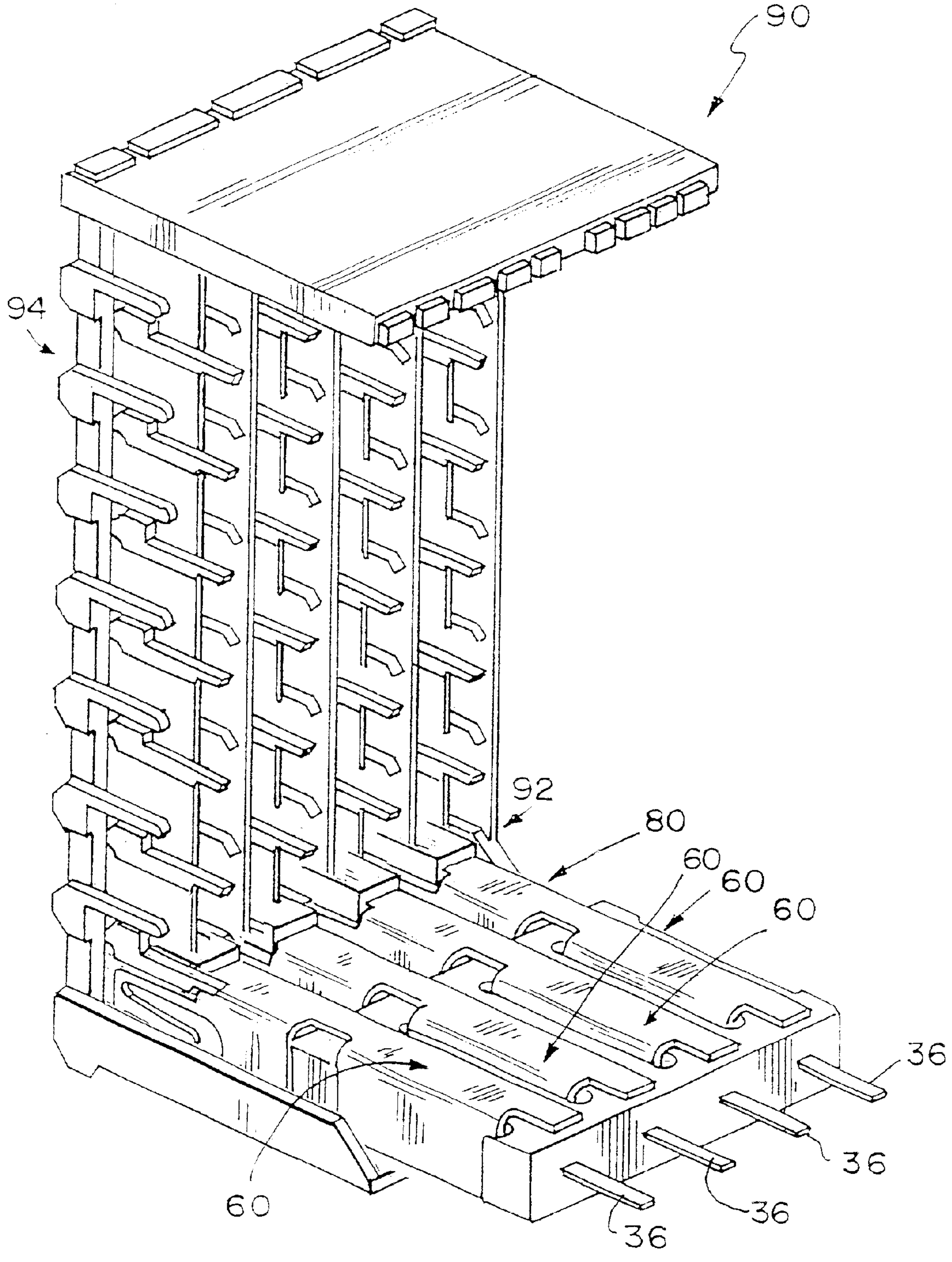
FIG. 10 is a perspective view showing the connector module pressed fully into the front cap with a press-fit connection.
Figure 11:
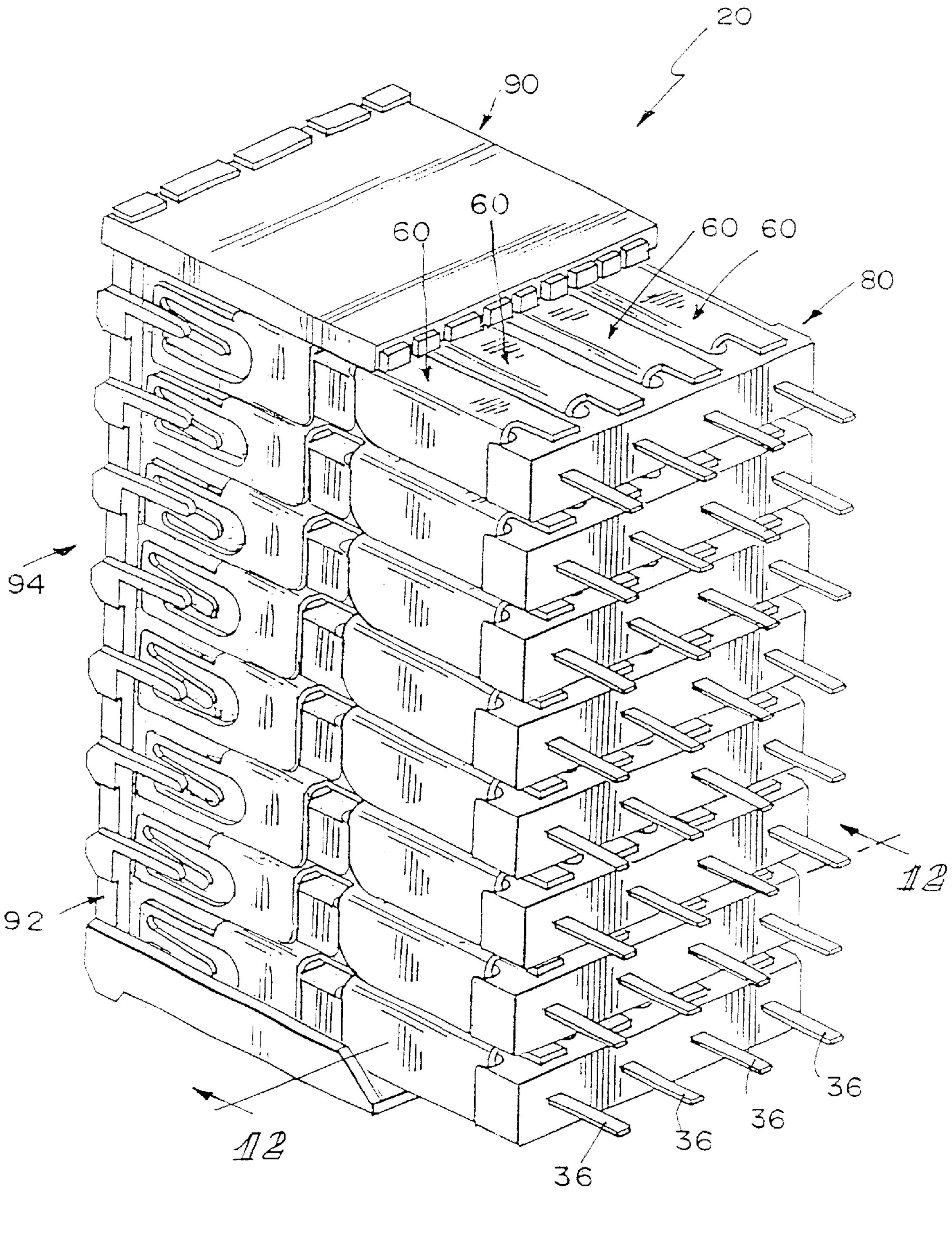
FIG. 11 is a perspective view showing a fully assembled connector including eight rows of connector modules arranged in vertical column, each row of connector modules having four contacts arranged in a horizontal row.

FIG. 8 shows a front cap 90 (also referred to as socket or connector housing) having horizontally-extending slots 92 configured for receiving the connector modules 80. FIG. 9 shows a connector module or a wafer 80 aligned with a horizontally-extending slot 92 in the front cap 90. FIG. 10 shows the connector module 80 pressed fully into the front cap 90 with a press-fit connection. FIG. 11 shows a fully assembled socket connector 20 including eight rows of connector modules 80 arranged in vertical column, with each row having four contacts 30 arranged in a horizontal row. FIG. 12 is a partial sectional view of the socket connector 20 showing the vertical and horizontal shielding portions 62, 64 of the shields 60 forming a virtual coaxial box around each signal contact 30. Coaxial shielding of each signal contact 30 allows transmission of high frequency signals at the points of connection with minimum interference and cross talk.

The 8×4 contacts 30 are aligned with 8×4 pin insertion windows 94 in front cap 90 when the connector modules 80 are assembled in the front cap 90. The pin insertion windows 94 guide the signal pins of a header connector (not shown) when the socket connector 20 is mated with a header connector. As previously indicated, the signal pins of the header connector are received by the spring arms 38 of the contacts 30 of the socket connector 20. The number of rows and columns in the socket connector 20 can be chosen freely and independently of each other. For example, one may design a socket connector 20 having 16 rows, with 8 contacts per row, instead of 8 rows, with 4 contacts per row. The socket connector 20 of the present invention is particularly suited for high speed cable application.

Alternatively, a connector module 80 may be pressed into a single row insulator (not shown) with a press-fit connection (also referred to as a single row concept). The assembled connector modules 80 may then be stacked to a desired height (e.g., 16 rows or 8 rows), and inserted in a perimetral housing (not shown). The housing holds the assembled connector modules 80 in place, and provides insulation and shielding around the stacked connector modules 80.

Illustratively, the materials used for the socket connector 20 are as follows:

a) signal contacts 30: copper alloy, UNS C70250, 0.2% offset, 95–120 ksi yield, 100–125 ksi tensile b) signal contact overmold 50: 30% glass-filled LCP, Dupont Zenite 6130L c) shield 60: phosphor bronze, 510 spring temper d) shield overmold 70: 30% glass-filled LCP. Dupont Zenite 6330 e) front cap 90: 30% glass-filled LCP, Dupont Zenite 3226L

Although the present invention has been described in detail with reference to certain preferred embodiments, variations and modifications exist within the scope and spirit of the-present invention as described above.

What is claimed is:

1. A connector comprising a plurality of horizontally-spaced contacts arranged in a row with each contact having a forwardly-extending contact portion configured to engage a corresponding contact in a mating connector, an intermediate portion and a rearwardly-extending tail portion, an insulative housing over the intermediate portions of the contacts, the housing having a top wall and a plurality of horizontally-spaced vertical slots extending through the top wall and positioned between the contact intermediate portions, each slot extending in the direction of the adjacent contact, and a shield for each contact, each shield having a vertical flange portion for insertion into one of the vertical slots in the insulative housing and an upper horizontal portion extending along and above the top wall of the housing and above the intermediate portion of the adjacent contact.

2. The connector of claim 1 wherein the forwardly-extending contact portion of each contact is configured to engage a corresponding signal pin of a mating connector, wherein the vertical flange portion of each shield includes a forwardly-extending vertical shield portion located next to a forwardly-extending contact portion of an adjacent contact, and wherein the forwardly-extending vertical shield portion is configured to engage a ground pin of a mating connector.

3. The connector of claim 1 wherein each contact is provided with a separate shield.

4. The connector of claim 1 wherein the contacts are formed on strips with the horizontal spacing between successive contacts a first distance, the shields being formed on strips with adjacent shields being spaced apart a second distance equal to twice the first distance such that a first set of shields may be inserted into every other slot while disposed on a first strip and then a second set of shields may be inserted into the empty slots between the first set of shields while disposed on a second strip.

5. The connector of claim 4 in which the housing is formed by overmolding a plastic insulator over the contact intermediate portions while the contacts are on a strip with the slots being formed respectively between adjacent contacts.

6. The connector of claim 1 wherein the upper horizontal portion of each shield includes a forwardly-extending horizontal shield portion located above the forwardly-extending contact portion of each contact, and wherein the forwardly-extending horizontal shield portion of each shield includes an insulative housing surrounding the forwardly-extending horizontal shield portion.

7. The connector of claim 6 wherein the insulative housing surrounding the forwardly-extending horizontal shield portion is formed by overmolding a plastic insulator over the forwardly-extending horizontal shield portion of the upper horizontal portion while the shields are on a strip.

8. An electrical connector comprising:

a connector housing, and a plurality of connector modules configured for insertion into the connector housing, each connector module including:

a plurality of horizontally-spaced contacts arranged in a row with each contact having a forwardly-extending contact portion configured to engage a corresponding contact in a mating header connector, an intermediate portion and a rearwardly-extending tail portion, an insulative housing over the intermediate portions of the contacts, the housing having a top wall and a plurality of horizontally-spaced vertical slots extending through the top wall and positioned between the contact intermediate portions, and a shield for each contact, each shield having a vertical flange portion for insertion into one of the vertical slots in the insulative housing and an upper horizontal portion extending along and above the top wall of the housing and above the intermediate portion of the adjacent contact.

9. An electrical connector comprising:

a connector housing, and a plurality of connector modules configured for insertion into the connector housing, each connector module including an insulative housing encasing a plurality of horizontally-spaced contacts arranged in a row with each contact having a forwardly-extending contact portion configured to engage a corresponding contact in a mating header connector, an intermediate portion and a rearwardly-extending tail portion, the insulative housing having a top wall and a plurality of horizontally-spaced vertical slots extending through the top wall and positioned between the contact intermediate portions, each connector module including a shield for each contact, each shield having a vertical flange portion for insertion into one of the vertical slots and an upper horizontal portion extending along and above the top wall of the housing and above the intermediate portion of the adjacent contact.

10. A connector comprising an insulative housing encasing a plurality of longitudinally-extending laterally-spaced signal contacts arranged in a row, the housing having a top wall and a plurality of vertically-extending laterally-spaced openings which extend through the top wall and which are interleaved with the plurality of longitudinally-extending laterally-spaced signal contacts, each opening extending in the direction of an adjacent contact, and a shield for each contact, each shield having a vertically-extending flange portion for insertion into one of the vertically-extending openings in the housing and a laterally-extending flange portion extending along the top wall adjacent to a signal contact in the housing, the vertically and laterally-extending flange portions being configured to form a shield around each signal contact.

11. A connector comprising a plurality of horizontally-spaced contacts arranged in a row with each contact having a forwardly-extending contact portion configured to engage a corresponding contact in a mating connector, an intermediate portion and a rearwardly-extending tail portion, an insulative housing over the intermediate portions of the contacts, the housing having a top wall, a bottom wall, a body and a plurality of horizontally-spaced vertical slots extending through the body and through the top and bottom walls and positioned between the contact intermediate portions, each slot extending in the direction of the adjacent contact, and a shield for each contact, each shield having a vertical flange portion for insertion into one of the vertical slots in the insulative housing and an upper horizontal portion extending along and above the top wall of the housing and above the intermediate portion of the adjacent contact.

* * * * *

UNITED STATES PATENT AND TRADEMARK OFFICE

CERTIFICATE OF CORRECTION

PATENT NO. : 6,478,624 B2
DATED : November 12, 2002
INVENTOR(S) : Ramey, Samuel C.

It is certified that error appears in the above-identified patent and that said Letters Patent is hereby corrected as shown below:

Title page,
Item [56], References Cited, U.S. Patent Documents "5,137,475" should read -- 5,137,472 --.

Signed and Sealed this

Twenty-fifth Day of March, 2003

JAMES E. ROGAN
*Director of the United States Patent and Trademark Office*